United States Patent
Iyer et al.

(10) Patent No.: US 11,138,949 B2
(45) Date of Patent: Oct. 5, 2021

(54) DETERMINATION OF SCREEN MODE AND SCREEN GAP FOR FOLDABLE IHS

(71) Applicant: Dell Products, L.P., Round Rock, TX (US)

(72) Inventors: Vivek Viswanathan Iyer, Austin, TX (US); Philip M. Seibert, Austin, TX (US)

(73) Assignee: Dell Products, L.P., Round Rock, TX (US)

(*) Notice: Subject to any disclaimer, the term of this patent is extended or adjusted under 35 U.S.C. 154(b) by 0 days.

(21) Appl. No.: 16/413,728

(22) Filed: May 16, 2019

(65) Prior Publication Data

US 2020/0365110 A1    Nov. 19, 2020

(51) Int. Cl.
*G09G 5/00*      (2006.01)
*G06F 1/16*      (2006.01)

(52) U.S. Cl.
CPC ........... *G09G 5/003* (2013.01); *G06F 1/1652* (2013.01); *G09G 2354/00* (2013.01); *G09G 2380/02* (2013.01)

(58) Field of Classification Search
CPC ..................................................... G09G 5/003
See application file for complete search history.

(56) References Cited

U.S. PATENT DOCUMENTS

| | | | |
|---|---|---|---|
| 2010/0064536 A1* | 3/2010 | Caskey | G06F 1/1677 33/303 |
| 2015/0331593 A1* | 11/2015 | Lee | G06F 1/1677 345/667 |
| 2017/0357292 A1* | 12/2017 | Cho | G06F 3/03545 |

OTHER PUBLICATIONS

"How do I detect a window open event," Visual Studio Languages, NET Framework, Visual C#, 11 pages, retrieved Feb. 26, 2019, available at https://social.msdn.microsoft.com/Forums/vstudio/en-US/1953f400-6f1c-49e0-a63e-d724bccc7676/how-do-i-detect-a-window-open-event?forum=csharpgeneral.

Stack Overflow, "How can I split a window in two in windows api," 6 pages, retrieved Feb. 26, 2019, available at https://stackoverflow.com/questions/10467112/how-can-i-split-a-window-in-two-in-windows-api.

Microsoft, "Application User Model IDs (AppUserModelIDs)," May 30, 2018, 8 pages, retrieved Feb. 26, 2019, available at https://docs.microsoft.com/en-us/windows/desktop/shell/appids.

Display Fusion, "Multiple Monitors Made Easy," by Binary Fortress Software, 2 pages, retrieved Feb. 26, 2019, available at https://www.displayfusion.com/.

* cited by examiner

*Primary Examiner* — Gustavo Polo
(74) *Attorney, Agent, or Firm* — Fogarty LLP

(57) ABSTRACT

An Information Handling System (IHS) includes a foldable display and is configured to determine a posture of the IHS based on the angle that the display is folded. The folded display is divided into first and second screen portions. Changes in the posture of the IHS are detected and the content and orientation of the content to display in the respective screen portions is determined. A gap is displayed along the fold of the foldable display, where the gap separates the screen portions along the fold. The width of the gap separating the screen portions may be determined based on the angle that the foldable display is folded and/or based on various additional aspects of the current posture of the IHS.

20 Claims, 6 Drawing Sheets

DETERMINATION OF SCREEN MODE AND SCREEN GAP FOR FOLDABLE IHS

FIELD

This disclosure relates generally to Information Handling Systems (IHSs), and more specifically relates to IHSs utilizing foldable displays.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

IHSs may provide visual outputs to users via various types of integrated and external displays. Until recently, the displays used by IHSs have only been flat, rigid displays. Certain IHSs now utilize foldable displays allowing the display, and in certain instances the IHS, to be folded. Foldable displays provide for easier transport and storage of an IHS. In some instances, foldable IHSs may remain operational while fully unfolded and also while partially unfolded. Certain foldable IHSs incorporating foldable displays may also provide processing, memory, networking and other I/O capabilities that allow the foldable IHS to be used as a standalone system and may thus be used in a variety of operating scenarios ranging from use as a laptop to use as a handheld.

SUMMARY

In various embodiments, an Information Handling System (IHS) includes: a foldable display; a logic unit configured via firmware instructions to determine a posture of the IHS based in part on an angle at which the display is folded, wherein the folded display is divided by a fold into a first screen portion and a second screen portion; and a processor configured via software instructions to: detect a change in the posture of the IHS reported by the logic unit; determine content to display in the first screen portion and in the second screen portion; and determine an orientation of the content to display in the first screen portion and the second screen portion.

In additional IHS embodiments, the foldable display is folded along a hinge of the IHS and wherein the posture is determined based in part on an angle of the hinge. In additional IHS embodiments, a gap is displayed along the fold in the foldable display and wherein the gap separates the first screen portion from the second screen portion. In additional IHS embodiments, the processor is further configured to determine a width of the gap separating the first screen portion and the second screen portion. In additional IHS embodiments, the width of the gap is determined based at least in part on an angle the foldable display is folded. In additional IHS embodiments, the width of the gap is determined based at least in part on the posture of the IHS. In additional IHS embodiments, the physical posture is determined based on detected movement of the IHS. In additional IHS embodiments, the width of the gap is determined to be zero based on the posture of the IHS indicating that no separation is required between the first screen portion and the second screen portion.

In various additional embodiments, a method determines a screen mode for a foldable display of an IHS (Information Handling System). The method includes: determining a posture of the IHS based in part on an angle at which the display is folded, wherein the folded display is divided by a fold into a first screen portion and a second screen portion; detecting a change in the posture of the IHS; determining content to display in the first screen portion and in the second screen portion; and determining an orientation of the content to display in the first screen portion and the second screen portion.

In additional method embodiments, the foldable display is folded along a hinge of the IHS and wherein the posture is determined based in part on an angle of the hinge. In additional embodiments, the method further includes displaying a gap along the fold in the foldable display, wherein the gap separates the first screen portion from the second screen portion. In additional embodiments, the method further includes determining a width of the gap separating the first screen portion and the second screen portion. In additional embodiments, the method further includes determining the width of the gap based at least in part on an angle the foldable display is folded. In additional embodiments, the method further includes determining the width of the gap based at least in part on the posture of the IHS. In additional method embodiments, the physical posture is determined based on detected movement of the IHS. In additional method embodiments, the width of the gap is determined to be zero based on the posture of the IHS indicating that no separation is required between the first screen portion and the second screen portion.

In various additional embodiments, a computer-readable storage device of an IHS (Information Handling System) includes a foldable display and includes program instructions stored thereon that, upon execution by one or more processors, cause the one or more processors to: determine a physical posture of the IHS based in part on an angle at which the display is folded, wherein the folded display is divided by a fold into a first screen portion and a second screen portion; detect a change in the physical posture of the IHS; determine content to display in the first screen portion and in the second screen portion; and determine an orientation of the content to display in the first screen portion and the second screen portion.

In additional storage device embodiments, the foldable display is folded along a hinge of the IHS and wherein the physical posture is determined based in part on an angle of the hinge. In additional storage device embodiments, the program instructions further causing the one or more processors to display a gap along the fold in the foldable display, wherein the gap separates the first screen portion from the second screen portion. In additional storage device embodiments, the program instructions further causing the one or more processors to determine a width of the gap separating the first screen portion and the second screen portion based on an angle of folding of the foldable display.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources, such as a Central Processing Unit (CPU) or hardware or software control logic, Read-Only Memory (ROM), and/or other types of nonvolatile memory.

Figure 1:
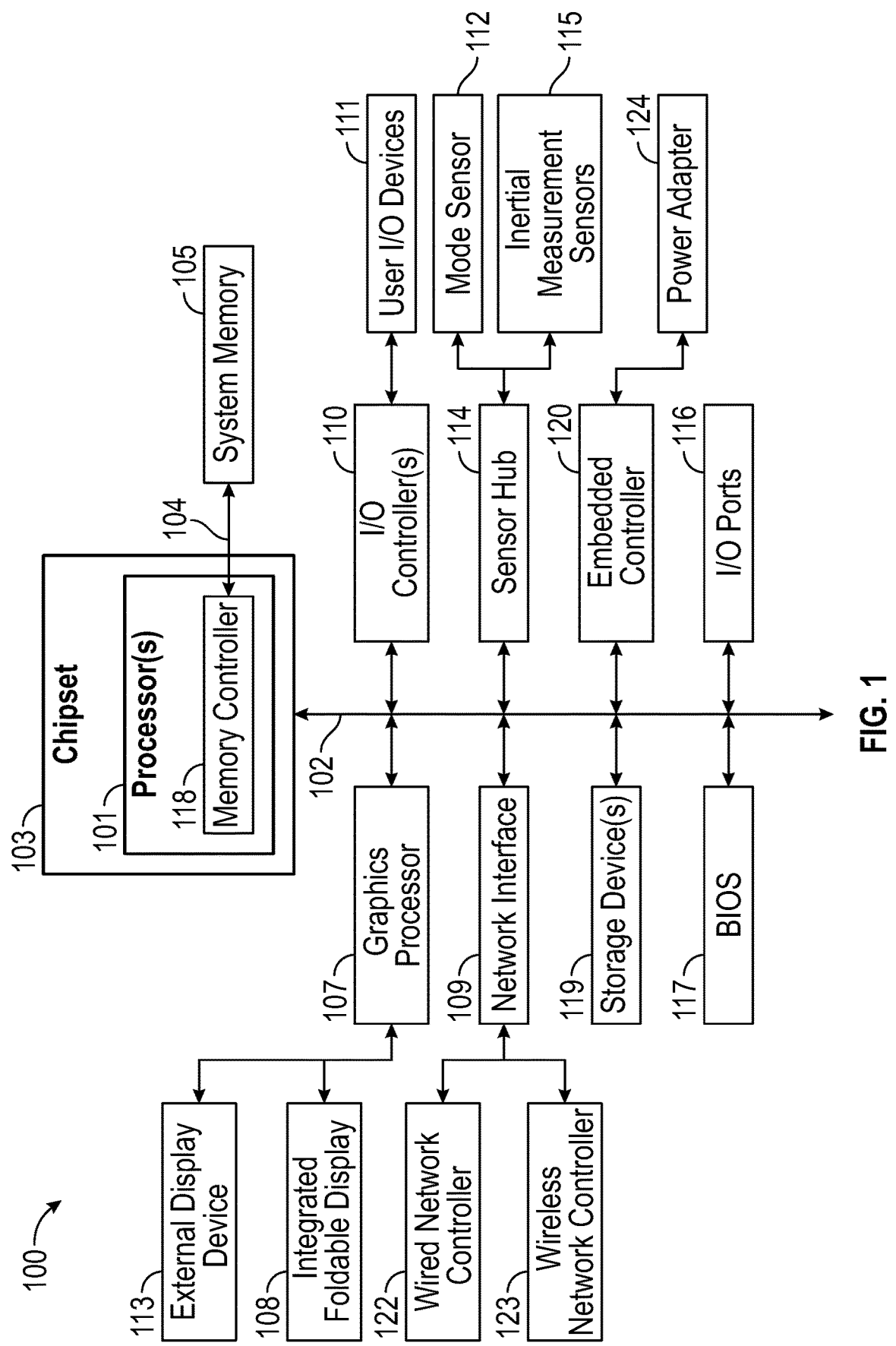
FIG. 1 is a block diagram depicting certain components of an IHS configured according to various embodiments for determining a screen mode and a display gap for a foldable display of the IHS.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below. FIG. 1 shows an example of an IHS configured to implement the systems and methods described herein according to certain embodiments. It should be appreciated that although certain IHS embodiments described herein may be discussed in the context of a personal computing device, other embodiments may be utilized.

FIG. 1 is a block diagram illustrating certain components of an IHS 100 configured according to certain embodiments for determining a screen mode and a displayed gap for a foldable display 108 of the IHS 100. In various embodiments, IHS 100 may include an embedded controller 120, graphics processor 107 and a sensor hub 114 that may each executes program instructions that cause these components to perform certain of the operations disclosed herein. IHS 100 includes an integrated foldable display 108 that may be configured as described with regard to the below embodiments to operate according to different screen modes that may utilize a gap that divides the foldable display into separate portions, where a gap may be displayed along the length of the folded portion of the display.

IHS 100 includes one or more processors 101, such as a Central Processing Unit (CPU), that execute code retrieved from a system memory 105. Although IHS 100 is illustrated with a single processor 101, other embodiments may include two or more processors, that may each be configured identically, or to provide specialized processing functions. Processor 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, the processor 101 includes an integrated memory controller 118 that may be implemented directly within the circuitry of the processor 101, or the memory controller 118 may be a separate integrated circuit that is located on the same die as the processor 101. The memory controller 118 may be configured to manage the transfer of data to and from the system memory 105 of the IHS 100 via a high-speed memory interface 104. In certain embodiments, power to processor 101 and/or system memory 105 may be turned off, or configured to operate at a minimal power level, in response to IHS 100 entering a low-power operating state.

The system memory 105 that is coupled to processor 101 provides the processor 101 with a high-speed memory that may be used in the execution of computer program instructions by the processor 101. Accordingly, system memory 105 may include memory components, such as such as static RAM (SRAM), dynamic RAM (DRAM), NAND Flash memory, suitable for supporting high-speed memory operations by the processor 101. In certain embodiments, system memory 105 may combine both persistent, non-volatile memory and volatile memory. In certain embodiments, the system memory 105 may be comprised of multiple removable memory modules.

IHS 100 utilizes a chipset 103 that may include one or more integrated circuits that are connect to processor 101. In the embodiment of FIG. 1, processor 101 is depicted as a component of chipset 103. In other embodiments, all of chipset 103, or portions of chipset 103 may be implemented directly within the integrated circuitry of the processor 101. Chipset 103 provides the processor(s) 101 with access to a variety of resources accessible via bus 102. In IHS 100, bus 102 is illustrated as a single element. Various embodiments may utilize any number of separate buses to provide the illustrated pathways served by bus 102.

As illustrated, a variety of resources may be coupled to the processor(s) 101 of the IHS 100 through the chipset 103. For instance, chipset 103 may be coupled to a network interface 109 that may support different types of network connectivity. In certain embodiments, IHS 100 may include one or more Network Interface Controllers (NIC), each of which may implement the hardware required for communicating via a specific networking technology, such as W-Fi, BLUETOOTH, Ethernet and mobile cellular networks (e.g., CDMA, TDMA, LTE). As illustrated, network interface 109 may support network connections by wired network controllers 122 and by wireless network controller 123. Each network controller 122, 123 may be coupled via various buses to the chipset 103 of IHS 100 in supporting different types of network connectivity, such as the network connectivity utilized by the operating system of IHS 100.

Chipset 103 may also provide access to an integrated foldable display 108 and one or more external displays 113 via a graphics processor 107. In certain embodiments, graphics processor 107 may be comprised within a video card, graphics card or within an embedded controller installed within IHS 100. In certain embodiments, graphics processor 107 may be integrated within processor 101, such as a component of a system-on-chip. Graphics processor 107 may generate display information and provide the generated information to one or more display device(s) 108, 113 utilized by IHS 100.

The IHS 100 utilizes an integrated display device 108 that is a foldable display, allowing the user to fold the display to a closed position, or to a partially or fully open position that allows the IHS 100 to be used in a variety of physical configurations. In certain embodiments, the integrated foldable display device 108 may utilize OLED (organic light-emitting diode) technology, or another display technology that supports flexible displays that may be folded as described herein. In certain embodiments, the integrated foldable display 108 may be capable of receiving touch inputs such as via a touch controller that may be an embedded component of the foldable display device 108, graphics processor 107 or a separate component of IHS 100 accessed via bus 102. In certain embodiments, IHS 100 may also support use of one or more external displays 113, such as external monitors that may be coupled to IHS 100 via various types of wired and wireless connections.

Other components of IHS 100 may include one or more I/O ports 116 that support removeable couplings with various types of peripheral external devices and systems. For instance, I/O 116 ports may include USB (Universal Serial Bus) Type-C ports, by which a variety of external devices may be coupled to IHS 100. I/O ports 116 may include various types of ports and couplings that support connections with external devices and systems through temporary couplings via ports accessible to a user via the enclosure of the IHS 100.

Chipset 103 also provides processor 101 with access to one or more storage devices 119. In various embodiments, storage device 119 may be integral to the IHS 100, or may be external to the IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud drive accessible via network interface 109.

As illustrated, IHS 100 also includes a BIOS (Basic Input/Output System) 117 that may be stored in a non-volatile memory accessible by chipset 103 via bus 102. Upon powering or restarting IHS 100, processor(s) 101 may utilize BIOS 117 instructions to initialize and test hardware components coupled to the IHS 100. The BIOS 117 instructions may also load an operating system for use by the IHS 100. The BIOS 117 provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

In certain embodiments, chipset 103 may utilize one or more I/O controllers 110 that may each support hardware components such as user I/O devices 111. Such I/O devices 111 may be integrated components of IHS 100 or the I/O devices 111 may be external components that may be temporarily coupled to IHS 100. For instance, I/O controller 110 may provide access to one or more user I/O devices 110 such as a keyboard, mouse, touchpad, touchscreen, microphone, speakers, camera and other input and output devices that may be coupled to IHS 100. Each of the supported user I/O devices 111 may interface with the I/O controller 110 through wired or wireless connections.

As illustrated, certain IHS 100 embodiments may utilize a sensor hub 114 or other logic unit capable of determining the relative orientation and/or movement of IHS 100 based on various sensor inputs. For instance, sensor hub 114 may utilize inertial movement sensors 115, that may include accelerometer, gyroscope and magnetometer sensors capable of determining the current orientation and movement of IHS 100 (e.g., IHS 100 is motionless on a relatively flat surface or IHS 100 is being moved irregularly and is likely being held by a user). In certain embodiments, sensor hub 114 may also include capabilities for determining a location and movement of IHS 100 based on triangulation of network signals and based on network information provided by the operating system or by a network interface 109. In some embodiments, sensor hub 114 may support additional sensors, such as optical, infrared and sonar sensors, that may provide support for xR (virtual, augmented, mixed reality) sessions hosted by the IHS 100 and may be used by sensor hub 114 to provide an indication of a user's presence in proximity to IHS 100. For instance, in certain embodiments, sensor hub 114 may indicate whether a user is currently facing a portion of the integrated foldable display 108 and is thus in a position to utilize IHS 100.

Through folding of display 108 at different angles about a hinge or other folding mechanism, multiple different configurations for using the IHS 100 may be supported. As described in additional detail with regard to the embodiments of FIGS. 3A-D, an IHS utilizing a foldable display may be configured for use as a single-screen display or as a dual-screen display that splits the foldable display into two virtual displays along the length of the fold of the display. When folded in such a manner, the IHS 100 may be physically configured for use in different modes or postures. In certain embodiments, sensor hub 114 may include a mode sensor 112 that provides a determination of the current mode in which the IHS 100 is physically configured. In certain embodiments, such determinations may be made by the sensor hub 114 based on movement and orientation information provided by the inertial movement sensors 115 and further based on the angle at which the hinge, or other folding mechanism, is currently folded.

In certain embodiments, sensor hub 114 may utilize a mode sensor 112 that determines the current angle of the hinge and thus the angle at which the display 108 is currently folded. Based upon this angle of rotation of a hinge from a closed position, the sensor hub 114 may determine the mode in which the IHS 100 is configured. For instance, a first range of angles of rotation from a closed position may indicate a book configuration and a second range of angles may indicate a fully open configuration that may be oriented in a landscape or portrait orientation. The sensor hub 114 may additionally utilize orientation and movement information to determine the mode in which the IHS 100 is physically configured. For instance, if the sensor hub 114 determines the IHS 100 is configured with a hinge angle indicating use in a book mode, but the IHS 100 is oriented such that one portion rests on a flat surface and, due to the fold, the other portion is pointed upwards, the IHS may be determined to be in a laptop configuration. If the IHS 100 is determined to be tiled towards a user's face and is experiencing slight movement, the sensor hub 114 may determine with relative certainty that the IHS 100 is being used in a book mode configuration. In this same manner, the sensor hub 114 may utilize movement and orientation information to confirm that an unfolded IHS 100 is immobile and resting on a flat surface and is thus likely being used in fully open posture.

In certain embodiments, sensor hub 114 may be an independent microcontroller or other logic unit that is coupled to the motherboard of IHS 100. In such embodiments, sensor hub 114 may communicate with various sensors and chipset 103 of processor 101 via a bus connection such as an Inter-Integrated Circuit (I2C) bus or other suitable type of multi-master bus connection. In certain embodiments, sensor hub 114 may be a component of an integrated system-on-chip incorporated into processor 101 and may utilize an I2C bus for communicating with sensors, such as the mode sensor 112, inertial measurement sensors 115 and sensors used for determining a user's presence near the IHS 100. Sensor hub 114 may collect and processes data from such sensors using data fusion techniques in order to determine the posture in which the IHS 100 is currently positioned.

As illustrated, IHS 100 embodiments may utilize an embedded controller 120 that may be a motherboard component of IHS 100 and may include one or more logic units. Firmware instructions utilized by embedded controller 120 may be used to operate a secure execution environment that may include operations for providing various core functions of IHS 100, such as power management, docking, management of operating modes in which IHS 100 may be physically configured and support for certain integrated I/O functions. In certain embodiments, embedded controller 120 may implement operations for interfacing with a power adapter 124 in managing power for IHS 100. Such operations may be utilized to determine the power status of IHS 100, such as whether IHS 100 is operating from battery power or is plugged into an AC power source.

Embedded controller 120 may similarly implement operations for detecting when IHS 100 is docked and undocked. In certain embodiments, docking of IHS 100 may be supported via coupling IHS 100 to a docking station, such as via an I/O port 116 supporting USB-C connections. In other embodiments, a docking station may instead include a cradle in which IHS 100 may be placed and may provide IHS 100 with power and data connections. In such embodiments, a docking cradle may include contact pads, connectors or other mechanisms for interfacing with a corresponding coupling mechanism located on the IHS 100. When docked in this manner, IHS 100 may be required to be in a fixed docking position in which the display 108 is unfolded to a fully open posture and in which display 108 cannot be folded. From such a fixed docking position, IHS 100 may be still used while placed in a docking cradle.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 101 as a systems-on-a-chip.

Figure 2A:
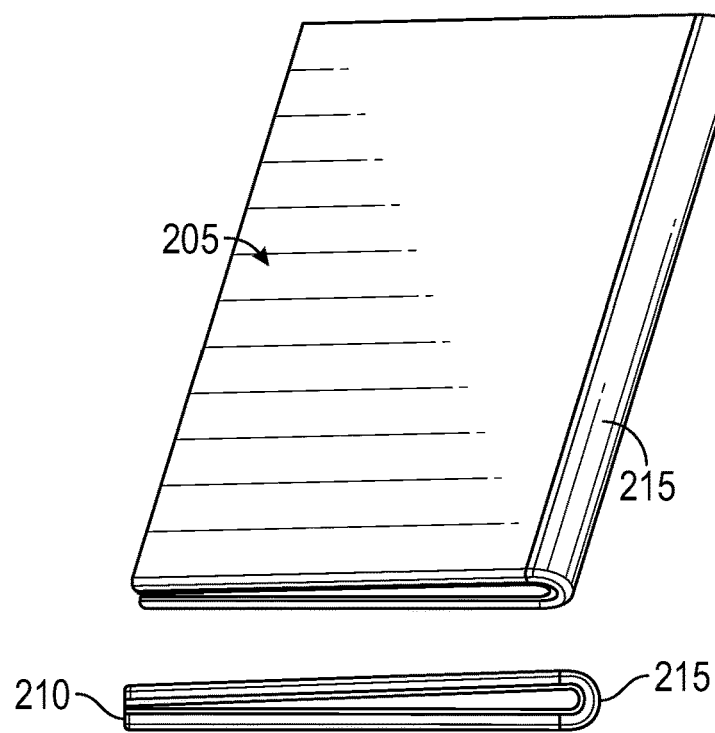
FIG. 2A is an illustration of a foldable IHS that is physically configured in a closed posture.

FIG. 2A is an illustration of a foldable IHS that is physically configured in a closed posture. As illustrated, a foldable IHS may be closed in a similar manner to a book or binder such that the IHS is divided into two portions along a central fold 215. The outer surface 205 of the foldable IHS may be an enclosure constructed of various types of plastic and/or metallic compounds. When folded as illustrated, the foldable display is protected within the closed outer surface 205, thus safeguarding the foldable display for transport or storage. In the profile view 210 of the closed posture, the two portions of the foldable IHS are rotated towards each other about the central fold 215 to their fullest extent. In certain instances, the central fold 215 may include a hinge that allows the two portions of the IHS to be folded and unfolded by a user.

Figure 2B:
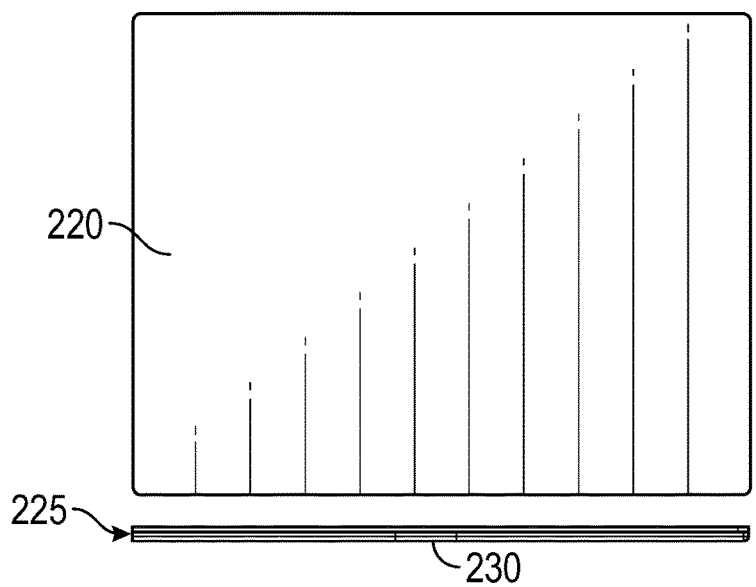
FIG. 2B is an illustration of a foldable IHS that is physically configured in a fully open posture.

FIG. 2B is an illustration of a foldable IHS that is physically configured in a fully open posture. Configured in this posture, the foldable display 220 is operational and provides the maximum available display area. In FIG. 2B, the foldable IHS is illustrated in a landscape orientation, in which the longest side of the display is horizontal. The foldable IHS may also be oriented in a portrait orientation, in which the longest side of the display is vertical. As illustrated in the profile view 225, in the fully open posture, the central fold 230 is opened to approximately 180 degrees. In this posture, the foldable IHS may be laid flat on a surface, propped up on a stand, or docked. In certain instances, a dock for use with a foldable IHS may include a cradle in which the foldable IHS may be placed while in a fully open posture such that the foldable IHS may remain in use while docked.

Figure 2C:
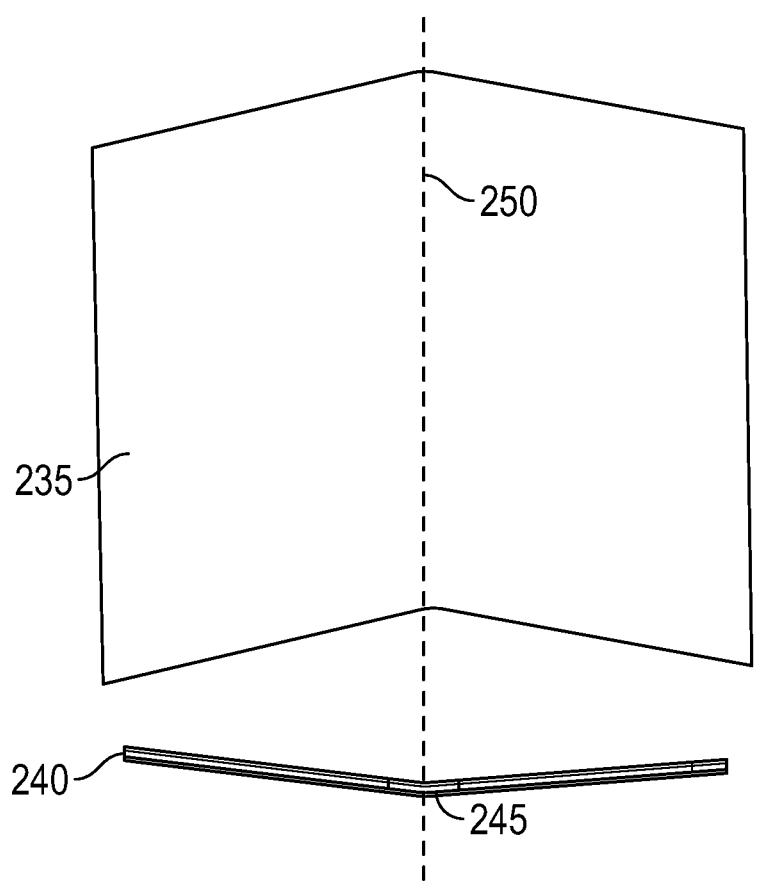
FIG. 2C is an illustration of a foldable IHS that is physically configured in a partially open posture.

FIG. 2C is an illustration of a foldable IHS that is physically configured in a partially open posture. As illustrated in the profile view 240, in the partially open posture, the central fold 245 is opened less than 180 degrees. The display 235 is divided into two portions along the fold 250 created by rotation of a hinge or other structure of the central fold 245. When partially open, the foldable IHS may be stood upright on a flat surface (e.g., similar to a hinged pair of picture frames that may be stood upright for display) or may be held by user in a manner similar to a book. Despite the fold 250 in the display 235, the entire foldable display 235 may remain functional. However, the content displayed along the length of the fold 250 may be distorted. In addition, as the display is folded further towards a closed position, the content displayed along the length of the fold 250 may become more difficult for a user to see. A similar effect is present in books that have an insufficient inner margin separating the text from the spine of the book.

Figure 3A:
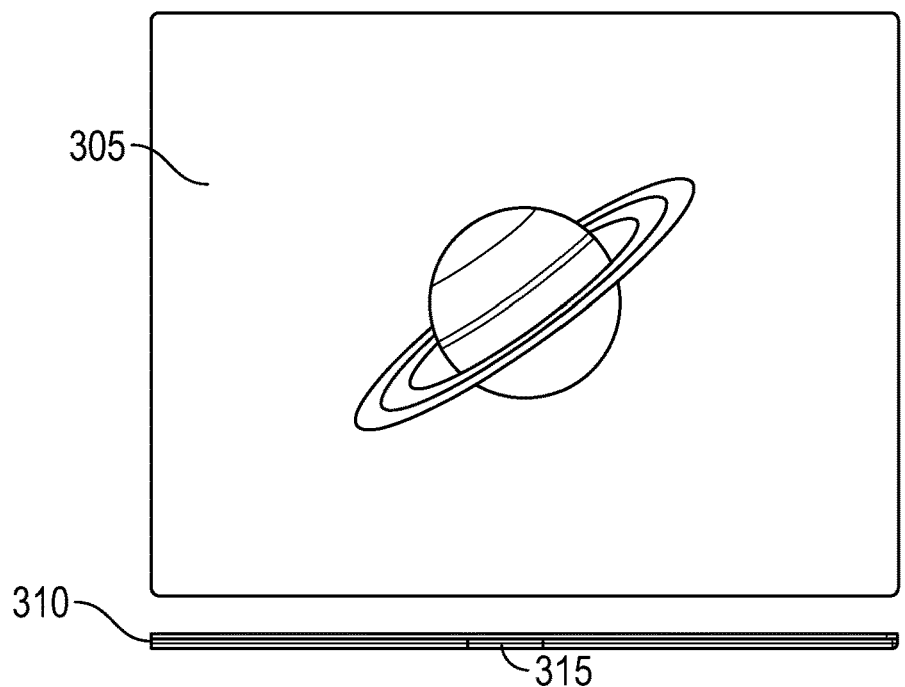
FIG. 3A is an illustration of a foldable IHS that is configured according to embodiments in a fully open posture utilizing a single screen display.

FIG. 3A is an illustration of a foldable IHS that is configured according to embodiments in a fully open posture and for use of a single-screen display. As described with regard to FIG. 1, embodiments of a foldable IHS may include capabilities for determining the posture in which a foldable IHS is physically configured. For instance, the posture of the foldable IHS may be determined based on sensor information providing the angle at which the display is folded and information regarding the orientation, position and movement of the foldable IHS. Based on such posture information, embodiments may determine a screen mode for the foldable display that is appropriate for a particular posture. For instance, in FIG. 3A, the foldable IHS is in a fully open posture such that the display 305 is fully unfolded. As illustrated in the profile view 310, the hinge 315 supporting a central fold is opened to 180-degrees such that the foldable IHS may be laid on a flat surface, propped upwards, or docked. As illustrated, in such a configuration, foldable display 305 may be utilized as a single screen that uses the full display 305.

Figure 3B:
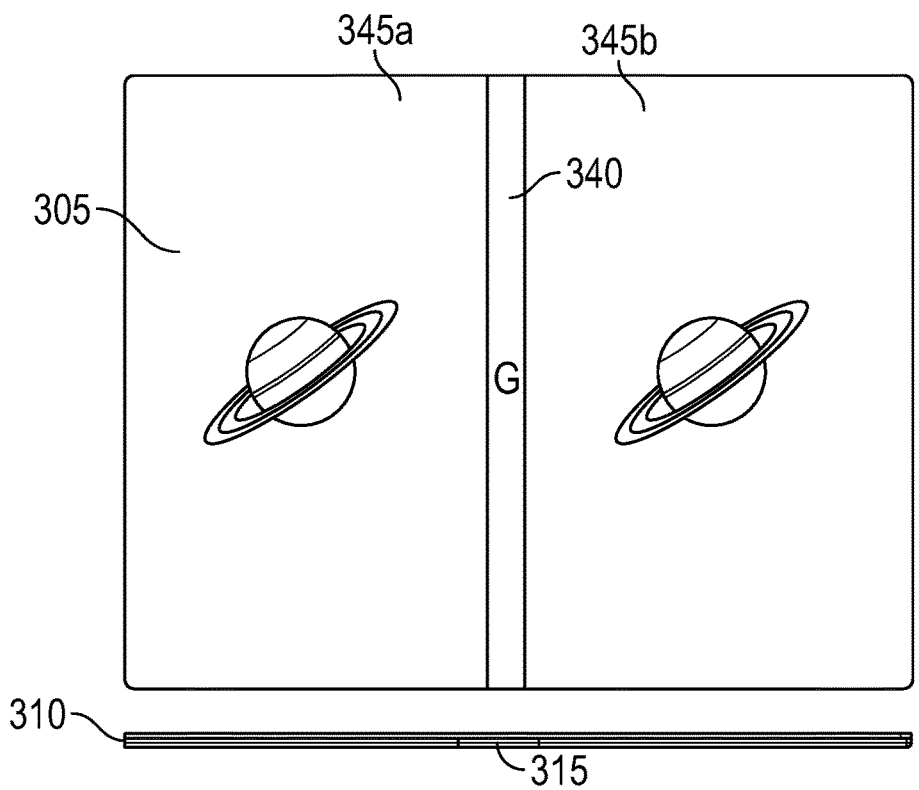
FIG. 3B is an illustration of a foldable IHS that is configured according to embodiments in a fully open posture while utilizing a dual screen display.

FIG. 3B is an illustration of a foldable IHS that is configured according to embodiments in a fully open posture and for use of a dual-screen display. As reflected in the profile view 310, the foldable IHS remains in a fully open posture with the hinge 315 in a fully open position and the display 305 fully unfolded. Whereas in FIG. 3A, the display 305 is used for a single screen, in FIG. 3B, the display 305 is divided into two screen portions 345a-b. As described in additional detail with regard to FIG. 4, embodiments may determine the application content to display in each of the screen portions 345a-b based on considerations such as the posture of the foldable IHS and the applications that are currently being used to display content.

In certain instances, embodiments may determine to split the display along the central fold 315 such that each of the portions 345a-b may be utilized as a separate screen. In some embodiments, the foldable IHS may be configured such that content from different applications may be shown in each of the portions 345a-b. For instance, a text editing application may be shown in the left-hand portion 345a and a web browser may be shown in the right-hand portion 345b. However, in certain instances, the foldable IHS may be configured such that content from a single application is shown in both portions 345a-b of the display 305. For instance, a reading application may show a page of text in the left-hand portion 345a and the following page of text in the right-hand portion 345b, similar to a conventional book.

In certain embodiments, the determination regarding whether to utilize the display 305 in a single screen or dual screen configuration may be based on the application that is currently selected for display by the user. For instance, applications for gaming or streaming video may indicate use of a single screen, such as in FIG. 3A. However, concurrent use of different applications (e.g., a photo editing application and a web browser) or use of a reading application may indicate use of dual screens, such as in FIG. 3B. As described in detail with regard to FIGS. 3D and 4, the two screen portions 345a-b may be separated by a gap 340 that is a separator, such as a black rectangle, displayed by the foldable display along the length of the hinge 315. In certain embodiments, the width of this displayed gap 340 between screen portion 345a-b may be determined based on the degree to which the display 305 is folded or based on various other aspects of the current posture of the foldable IHS.

Figure 3C:
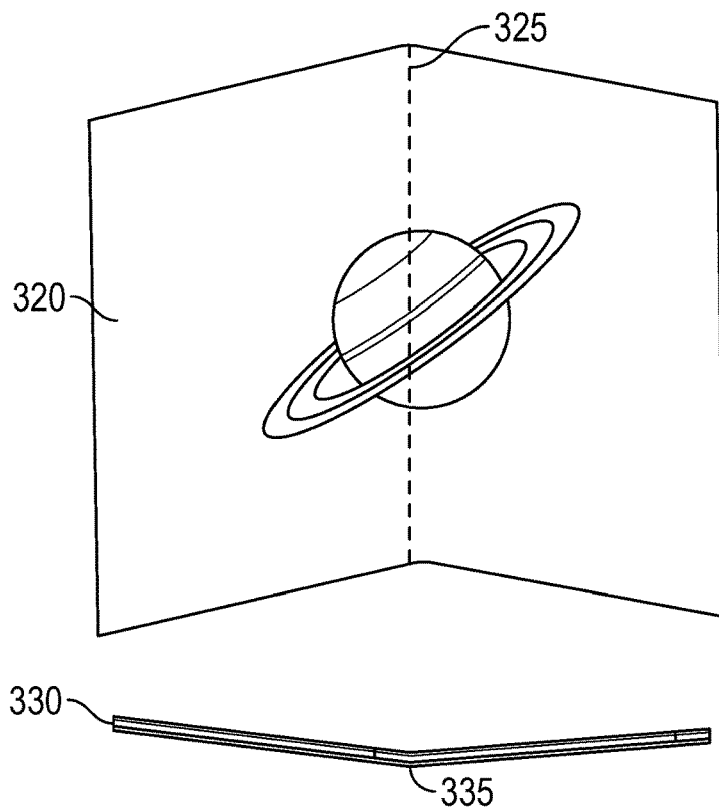
FIG. 3C is an illustration of a foldable IHS that is configured according to embodiments in a partially open posture utilizing a single screen display.

FIG. 3C is an illustration of a foldable IHS that is configured according to embodiments in a partially open posture and utilizing a single-screen display. As in the partially open posture of FIG. 2C, the profile view 330 illustrates the partially open hinge 335 that results in a fold 325 in the display 320. Similar to the single-screen display utilized in the fully open posture of FIG. 3A, the full display 320 may be utilized as a single-screen despite the fold 325 in the display 320. Embodiments may configure the single-screen use of the foldable IHS as illustrated in FIG. 3C based on the applications being displayed by the user. For instance, the display of a streaming video player may result in the full single-screen display of the video content. As described, display of content via a folded display may cause distortion of the displayed content along the length of the fold 325. In certain instances, such distortion may be acceptable. However, distortion along the length of the fold 325 may be unacceptable for the display of certain applications, such as a text editing or graphic design application.

Figure 3D:
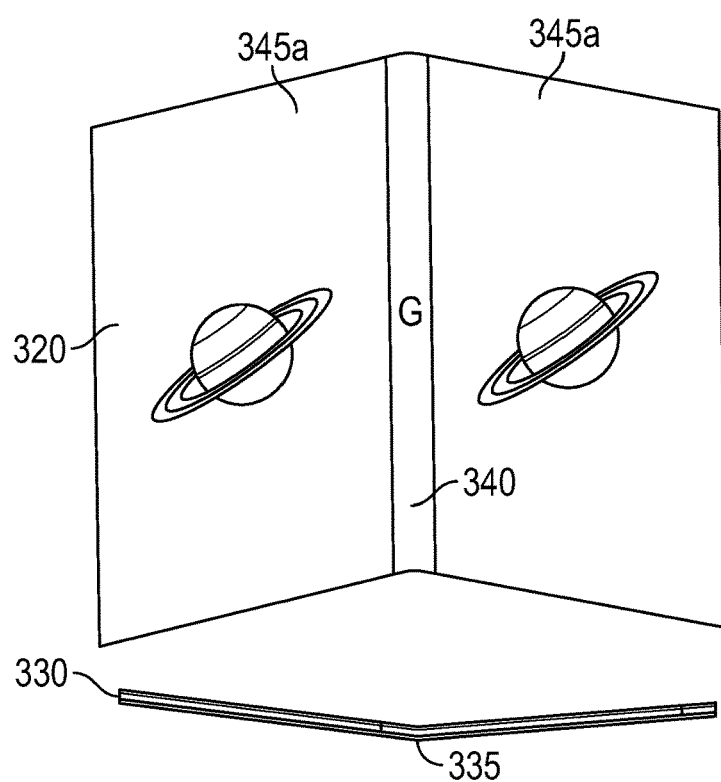
FIG. 3D is an illustration of a foldable IHS that is configured according to embodiments in a partially open posture while utilizing a dual screen display.

FIG. 3D is an illustration of a foldable IHS that is configured according to embodiments in a partially open posture while utilizing a dual-screen display. As described, the ability for the user to properly view content displayed along the length of a fold may be compromised to different degrees based on the angle at which the display is folded and by the application that is being used to display information. Accordingly, as described with regard to FIG. 3D, the folded display 320 may be divided into two portions 345a-b along the length of fold created through bending the display 320 at the central hinge 335. Also as described, the two portions 345a-b of the folded display 320 may be separated by a gap 340 that runs along the length of the fold 325. The displayed gap 340 serves to separate the content of each screen portion 345a-b. In certain instances, each of the portions 345a-b may be treated as separate, non-interacting displays such that content from one portion cannot be moved to another portion through a user input such as via drag-and-drop mouse operations. In other instances, each of the portions 345a-b may be treated as portions of an extended display that is separated by gap 340 and that allows for content to be moved between the two portions 345a-b.

In scenarios where the current posture of the foldable IHS indicates the use of a dual-screen mode, such as illustrated in FIG. 3B, the portions 345a-b of the display resulting from the fold may be separated by a gap 340 that is displayed along the length of the fold in the display 305. In certain embodiments, the gap 340 may be a rectangular shape or image that is displayed along the length of the fold 325 of the folded display 305. For instance, the gap 340 may be generated through display of a black rectangle that may be positioned along the length of the fold such that the gap 340 is centered above the hinge 335. Various embodiments may employ various techniques for displaying the gap 340 that separates the display 305 into two screen portions 345a-b. As described, when folded, the closer the foldable IHS is to the closed position (i.e., as the hinge is opened less from the closed position), the greater the difficulty of a user in viewing the content displayed along the fold. Accordingly, as described in additional detail with regard to FIG. 4, the width of the gap 340 may be adjusted based in part on the angle at with the IHS is folded and/or based on various other aspects of the current posture of the IHS.

Figure 4:
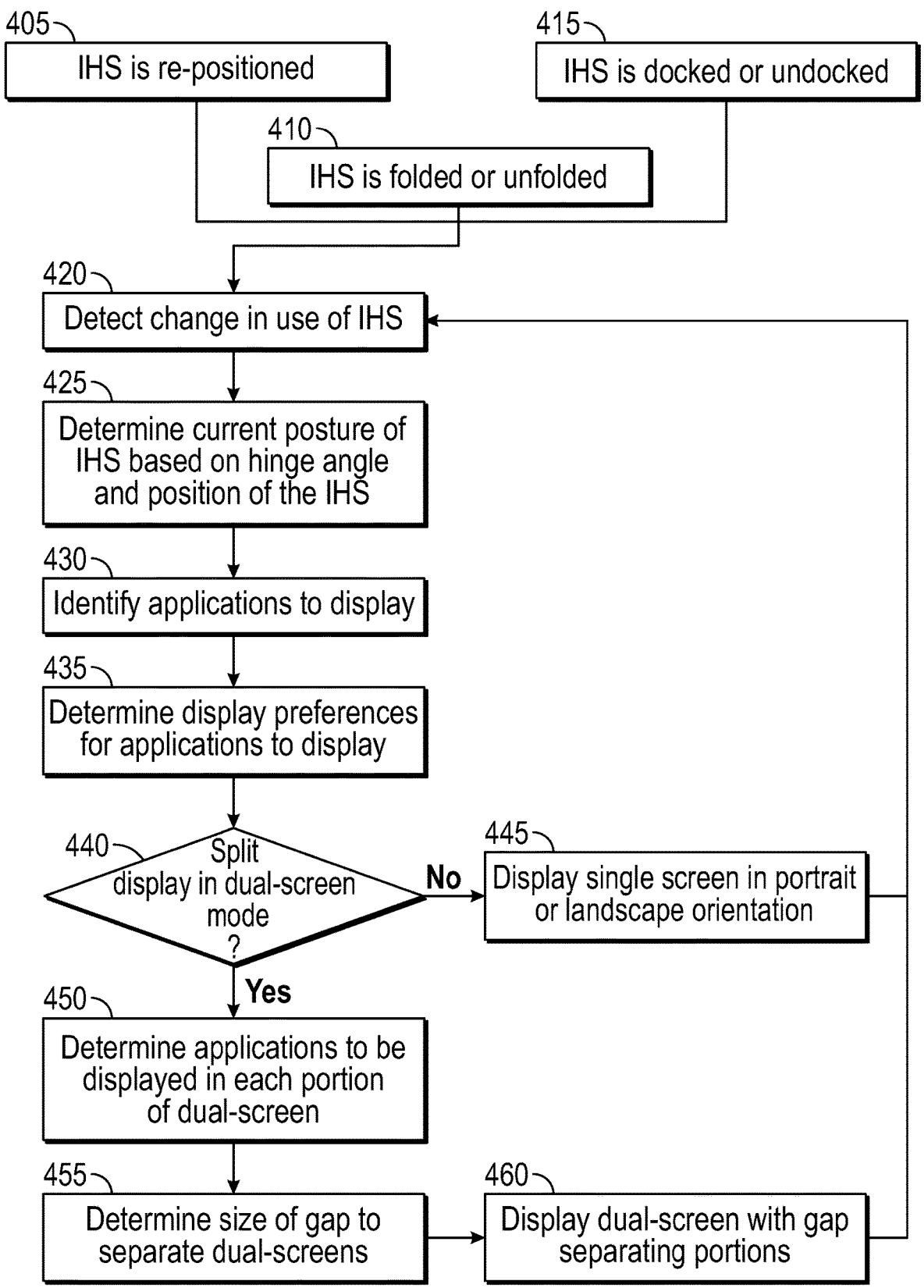
FIG. 4 is a flowchart describing certain steps of a process according to various embodiments for determining a screen mode and a display gap for a foldable display of the IHS.

FIG. 4 is a flowchart describing certain steps of a process according to various embodiments for determining a screen mode and a display gap for an IHS utilizing a foldable display. As described, a foldable IHS may include various capabilities for detecting changes to the posture in which the foldable IHS is physically configured for use. For instance, at block 410, any folding and unfolding of the IHS by the user may be determined. As described, a foldable IHS utilizing a hinge or other mechanical structure to support folding of the IHS may utilize a hinge angle sensor to detect any folding or unfolding of the IHS. As described with regard to FIG. 1, a sensor hub and/or an embedded controller may determine a posture of the foldable IHS based in part on the reported hinge angle. For instance, a fully folded hinge angle may correspond to a closed posture, such as illustrated in FIG. 2A, a partially folded hinge angle may correspond to a partially open posture, such as illustrated in FIG. 2C, and a fully open hinge angle may correspond to a fully open posture, such as illustrated in FIG. 2B.

In addition to tracking the folding and unfolding of the IHS, at block 405, repositioning of the foldable IHS may be determined. For instance, the movement of a foldable IHS to the partially open book posture of FIG. 2C may be determined based on detected movements indicating the foldable IHS is being held by a user in a partially open configuration with the foldable IHS oriented such that the fold is vertical. Additional indications of use of the foldable IHS in a book posture may be indicated through detection of a central axis of symmetry of the user's face in approximate alignment with the axis of the fold of the IHS. As described, the foldable IHS may also utilize sensors capable of detecting when the IHS is motionless and has been placed on a flat surface or has been propped such that the display faces the user.

As described, the foldable IHS may be docked either through a wired coupling, such as a USB-C connection, or via a cradle that receives the foldable IHS. At block 415, embedded controller of the foldable IHS may detect changes to the docking status of the IHS. In certain embodiments that utilize a docking cradle, the foldable IHS may remain usable while docked, but may be limited to a specific posture supported by the cradle, such as the fully open posture of FIG. 2B. Accordingly, a docking status of the foldable IHS may dictate the posture in which the IHS may be configured and may also dictate the orientation of the IHS.

At block 420, any such changes in the use of the foldable IHS are detected. For instance, any substantial changes to the hinge angle at which the IHS is folded may be detected and evaluated as indicating a possible change in posture by the user. Similarly, any changes in the orientation of the foldable IHS may also indicate a user switching postures, such as switching to or from a book posture. As described, a reported change in the docking status may require t foldable IHS to be in a specific posture such that detecting of a docking may indicate a specific docking posture that is associated with specific screen mode settings. In response to detecting any of such types of changes in the use of the IHS, at block 425, the current posture of the IHS may be determined, where the posture may be determined based on the angle at which the IHS is folded and further based on positioning information indicating movement and/or orientation of the IHS.

In order to determine a screen mode that is suitable for the current posture, at block 430, the applications currently being used to display information are determined. Certain embodiments may give consideration to all applications with graphical user interfaces that are currently visible to a non-negligible degree in the display, while other embodiments may give consideration only to applications determined to occupy at least a specific portion of the operating system desktop and that are also actively in use. In certain embodiments, where multiple applications are concurrently visible on the operating system desktop, the applications that are actively in use may be determined based on the percentage of the desktop that is being used to display each of the applications. Applications occupying only negligible portions of the desktop may be considered an inactive, while applications occupying large portions of the desktop may be considered active. Other indications of applications that are actively in use may be determined based on the recency of inputs to a user interface of the applications.

Once the active applications are determined, at block 435, any displayed preferences for the active applications are identified. As described, different applications may be associated with different display preferences. For instance, applications for watching streaming video or for gaming may be associated with a preference for display using a single-screen mode, even if the display is partially folded and some distortion will occur along the length of the fold. However, such preferences may also specify that if the IHS is folded beyond a certain threshold, then display of the streaming video or gaming content via dual-screen mode is preferred. Similarly, a text editing, spreadsheet, document viewer or graphic design application may be associated with a preference for single-screen mode as long as the IHS is in a fully-open posture, but may prefer display via a dual-screen mode if the display is in a partially open posture. As described, a reading application may be associated with a full-screen mode in scenarios where the foldable IHS is fully open and oriented in a portrait orientation, but may be associated with a dual-screen mode where the IHS is oriented in a landscape orientation, regardless of whether the IHS is in a fully open posture or a partially open posture.

Based on the display preferences of the visible applications and further based on the current posture of the foldable IHS, at block 440, embodiments may determine whether to split the display into dual-screen mode operation. For instance, in a scenario where the foldable IHS is in a fully-open posture and the display preferences of the predominantly visible application indicate a preference for a single-screen display, at block 445, embodiments may determine to utilize the display in a single-screen mode. In certain instance, applications may be associated with preference for use of dual-screen display as soon as the display is folded beyond a certain point. For instance, applications may prefer use of dual-screen displays anytime the display is opened less than 150 degrees from a closed posture. If use of a single-screen is determined, based on the orientation of the foldable IHS relative to the user, embodiments may further determine whether to display the single-screen in a landscape or portrait orientation.

In instances where the current posture of the foldable IHS and the display preferences associated with the visible applications indicate the use of a dual-screen mode, at block 450, embodiments may determine the applications to display in each of the portions of the dual-screen display. For instance, in scenarios where two applications are determined to be actively in use and visible within the operating system desktop, embodiments may assign each of the two applications to a separate display of the two dual-screen portions. In scenarios where one application is determined to be predominantly in use with other applications also actively used to a lesser extent, embodiments may assign the predominantly used application for display to one dual-screen display while the other active applications are displayed as tiled windows within the other dual-screen display. In scenarios where the application in use is a reading application and the foldable IHS is configured in a book posture, both of the dual-screen displays may be used for display by the reading application.

As described, when configured for dual-screen displays, the portions of the display used for each of the dual-screens may be separated by a gap that is displayed by the foldable IHS along the length of the fold. As described, in certain embodiments, a gap may be a rectangular shape, such as a black rectangle, that is displayed along the length of the fold that separates the display into the dual-screens. Embodiments may utilize various techniques for displaying the gap that separates the dual-screens. The width of this gap may be zero or otherwise imperceptible such that the two dual-screen displays appear contiguous along the fold of the IHS. As the width of the gap is increased, the separation of the dual-screen displays along the fold also increases. At block 455, embodiments may determine the width of this gap.

As described, as a foldable IHS is folded closer to a closed posture, the content that is displayed along the length of the fold may become further distorted and/or more difficult for the user to properly see. In utilizing the described gap, no content is displayed along this folded portion of the gap and a rectangular shape is displayed instead. By increasing the width of the gap, the content of the dual-screens is prevented from being displayed near the fold, thus reducing the effects of the folding of the IHS, even as the IHS is folded further towards a closed posture. Accordingly, in certain embodiments the width of the gap may be determined based on the angle at which the display is folded. Certain embodiments may utilize a formula such as the formula below that determines the width of the gap (GAP) that is selected from the lesser of a maximum gap width (MAX_GAP) that may be utilized and of a quadratic formula used to calculate a gap width based on the hinge angle (x) at which the display is folded.

$$GAP=MIN(Ax^2+Bx+C, MAX\_GAP)$$

In certain embodiments, coefficients (A, B, C) of the quadratic formula may be selected based on the applications that are displayed. For instance, a streaming video application may be associated with coefficients that reflect a preference that, when a gap is required, the gap should be as narrow as possible. However, a graphics editing application may place a premium on maintaining an undistorted view of the displayed content such that the graphics editing application may be associated with coefficients that promote a wider gap in order to provide a greater buffer from the distortion of the fold.

In certain embodiments, a formula for calculating the width of the gap may be utilized via which the gap width (GAP) may be selected from the lesser of a maximum gap width (MAX_GAP) and various other gap widths calculated based on various aspects (Ax, Bx, Cx, ... Nx) of the current posture of the IHS, some of which may be based on the hinge angle (x) at which the display is folded.

$$GAP=MIN(Ax, Bx, Cx, Dx \ldots Nx, MAX\_GAP)$$

For instance, in the formula below, a gap width Ax may be a function of the application(s) being used to display content in the portions of the dual-screen display. In such an embodiment, certain reading applications may display content that already utilizes sufficient margins such that a dual-screen mode may be utilized, but a gap (Ax) of zero or near-zero width may be utilized regardless of the angle (x) at which the display is folded. Also, as described, a graphics editing software application may require a minimum gap width (Bx) for any angle (x) that indicates any folding of the display. Similarly, a brightness of the current posture of the IHS as a function of the fold angle (x) may be associated with a particular gap (Cx). In other scenarios, environmental conditions may also be considered within determining a gap width. For instance, a color temperature or other measure of the ambient lighting in the vicinity of the IHS may be used to determine a gap width (Dx). Other functions for determining a gap width may be based on various other aspects of the display, such as contrast settings and/or whether blue-light reduction technologies are being utilized. In this manner, various aspects of the current posture of the foldable IHS may be used to determine the width of the gap to be displayed.

With the width of the gap determined, at 460, the dual-screens are displayed with the two portions separated by the gap of the determined width. As described, the applications that are displayed in each of the dual-screens may be determined based on the applications currently in use to display content. The user may commence use of the foldable IHS in the dual-screen mode. As indicated in FIG. 4, during such use of the foldable IHS, additional changes that are detected to the posture of the foldable IHS may trigger additional changes to the screen mode and the gap utilized by the foldable display.

The described embodiments support a foldable display with a single, central fold. However, additional embodiments may support a foldable display with multiple folds. For instance, a foldable IHS according to embodiments may include two hinges that allow the foldable display two be divided into three portions by the folds. In the same manner as described herein, a screen mode may be determined such that a single-screen display may be utilized (with this single-screen display potentially including two folds) if the foldable IHS is in a partially open or fully open posture. Based on the applications in use and the angles of the folds, a tri-screen display may be utilized, with each of the three screen portions separated by gaps running the length of the folds. Also, in the same manner as described herein, the widths of such gaps may be determined based on the angle of folds, where the gap for each fold may be separately determined since each hinge may be folded at a different angle.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS) comprising:
   a foldable display comprising a single display screen that is foldable along a folding portion of the screen;
   a logic unit configured via firmware instructions to determine a posture of the IHS based in part on an angle at which the display is folded, wherein the folded display is divided by a fold into a first screen portion and a second screen portion; and
   a processor configured via software instructions to:
      detect a change in the posture of the IHS reported by the logic unit, wherein the display is folded at a first angle in the changed posture;
      based on the first angle of the changed posture, determine a first width of a folded portion of the display screen that extends along the fold, wherein content displayed in the folded portion of the first width is distorted due to the fold;
      determine content to display in the first screen portion and in the second screen portion;
      in response to the detected change in posture of the IHS, display a gap of the first width along the folded portion of the display screen, wherein the first screen portion and the second screen portion are separated by the gap of the first width that displays distorted content that is not usable; and
      determine an orientation of the content to display in the first screen portion and the second screen portion.

2. The IHS of claim 1, wherein the foldable portion of the single display screen is along a hinge of the IHS.

3. The IHS of claim 1, wherein the gap that is displayed by the single display screen comprises a black rectangle of the first width that is displayed along the foldable portion of the single display screen.

4. The IHS of claim 1, wherein the first width of the gap that is displayed along the fold of the display screen is determined according to a quadratic equation that comprises an angle of the hinge as a variable.

5. The IHS of claim 4, wherein the quadratic equation further comprises coefficients that are selected based on an application that is displayed spanning the first screen portion and the second screen portion.

6. The IHS of claim 1, wherein the first width of the gap that is displayed by the single display screen is determined based at least in part on an application that is to be displayed spanning the first screen portion and the second screen portion.

7. The IHS of claim 1, wherein the first width of the gap that is displayed by the single display screen is determined based at least part on a brightness of the single display screen.

8. The IHS of claim 1, wherein the width of the gap that is displayed by the single display screen is determined to be zero based on the posture of the IHS indicating that no separation is required between the first screen portion and the second screen portion since there is no distortion of content displayed along the fold.

9. A method for determining a screen mode for a foldable display of an IHS (Information Handling System), the method comprising:
   determining a posture of the IHS based in part on an angle at which the display is folded, wherein the folded display comprising a single display screen that is foldable along a folding portion of the screen into a first screen portion and a second screen portion;
   detecting a change in the posture of the IHS, wherein the display is folded at a first angle in the changed posture;
   based on the first angle of the changed posture, determine a first width of a folded portion of the display screen that extends along the fold, wherein content displayed in the folded portion of the first width is distorted due to the fold;
   determining content to display in the first screen portion and in the second screen portion;
   in response to the detected change in posture of the IHS, displaying a gap of the first width along the folded portion of the display screen, wherein the first screen portion and the second screen portion are separated by the gap of the first width that displays distorted content that is not usable; and
   determining an orientation of the content to display in the first screen portion and the second screen portion.

10. The method of claim 9, wherein the foldable portion of the single display screen is along a hinge of the IHS.

11. The method of claim 9, wherein the gap that is displayed by the single display screen comprises a black rectangle of the first width that is displayed along the foldable portion of the single display screen.

12. The method of claim 9, wherein the first width of the gap that is displayed along the fold of the display screen is determined according to a quadratic equation that comprises an angle of the hinge as a variable.

13. The method of claim 12, wherein the quadratic equation further comprises coefficients that are selected based on an application that is to displayed spanning the first screen portion and the second screen portion.

14. The method of claim 9,
   wherein the first width of the gap that is displayed by the single display screen based at least in part on an application that is to be displayed spanning the first screen portion and the second screen portion.

15. The method of claim 9, wherein the first width of the gap that is displayed by the single display screen is determined based at least part on a brightness of the single display screen.

16. The method of claim 9, wherein the width of the gap that is displayed by the single display screen is determined to be zero based on the posture of the IHS indicating that no separation is required between the first screen portion and the second screen portion since there is no distortion of content displayed along the fold.

17. A computer-readable storage device of an IHS (Information Handling System) comprising a foldable display, wherein the storage device includes program instructions stored thereon that, upon execution by one or more processors, cause the one or more processors to:
- determine a physical posture of the IHS based in part on an angle at which the display is folded, wherein the folded display comprises a single display screen that is foldable along a folding portion of the screen into a first screen portion and a second screen portion;
- detect a change in the physical posture of the IHS, wherein the display is folded at a first angle in the changed posture;
- based on the first angle of the changed posture, determine a first width of a folded portion of the display screen that extends along the fold, wherein content displayed in the folded portion of the first width is distorted due to the fold;
- determine content to display in the first screen portion and in the second screen portion;
- in response to the detected change in posture of the IHS, display a gap of the first width along the folded portion of the single display screen, wherein the first screen portion and the second screen portion are separated by the gap of the first width that displays distorted content that is not usable; and
- determine an orientation of the content to display in the first screen portion and the second screen portion.

18. The computer-readable storage device of claim 17, wherein the foldable portion of the single display screen is along a hinge of the IHS.

19. The computer-readable storage device of claim 17, wherein the gap that is displayed by the single display screen comprises a black rectangle of the first width that is displayed along the foldable portion of the single display screen.

20. The computer-readable storage device of claim 19, wherein the first width of the gap that is displayed along the fold of the display screen is determined according to a quadratic equation that comprises an angle of the hinge as a variable.

* * * * *